United States Patent [19]

Biel et al.

[11] Patent Number: 4,612,221

[45] Date of Patent: Sep. 16, 1986

[54] MULTILAYER FOOD WRAP WITH CLING

[75] Inventors: Edward N. Biel, Munster, Ind.; George F. Kirkpatrick, Downers Grove, Ill.

[73] Assignee: Union Carbide Corporation, Danbury, Conn.

[21] Appl. No.: 810,908

[22] Filed: Dec. 20, 1985

Related U.S. Application Data

[63] Continuation of Ser. No. 552,380, Nov. 16, 1983, abandoned.

[51] Int. Cl.[4] ................................................. B27N 5/02
[52] U.S. Cl. .................................... 428/35; 428/475.8; 428/476.1; 428/483; 428/516; 428/520; 264/176.1; 426/127; 426/416; 229/80; 156/244.11
[58] Field of Search .............. 428/35, 516, 483, 522, 428/520, 475.8, 476.1; 426/127, 416; 156/244.11; 264/176 R; 229/53

[56] References Cited

U.S. PATENT DOCUMENTS

| 3,307,773 | 3/1967 | Kratzer | 229/80 |
|---|---|---|---|
| 3,423,231 | 1/1969 | Lutzmann | 117/68.5 |
| 3,840,427 | 10/1974 | Brazier et al. | 161/227 |
| 3,908,070 | 9/1975 | Marzolf | 428/475.8 |
| 3,912,843 | 10/1975 | Brazier | 428/474 |
| 4,095,012 | 6/1978 | Schirmer | 428/474 |
| 4,104,404 | 8/1978 | Bieler | 428/35 |
| 4,233,367 | 11/1980 | Ticknor et al. | 428/476.3 |
| 4,274,900 | 6/1981 | Mueller et al. | 428/483 |
| 4,329,388 | 5/1982 | Vicik et al. | 428/516 |
| 4,352,850 | 10/1982 | Yamamoto et al. | 428/516 |
| 4,367,256 | 1/1983 | Biel | 428/516 |
| 4,386,124 | 5/1983 | Akao | 428/516 |
| 4,399,180 | 8/1983 | Briggs et al. | 428/516 |
| 4,401,256 | 8/1983 | Krieg | 428/475.8 |

OTHER PUBLICATIONS

U.S. Ser. No. 335,443; G. Kirkpatrick, Multilayer Thermoplastic Film.

*Primary Examiner*—Edith Buffalow
*Attorney, Agent, or Firm*—Karen E. Klumas

[57] ABSTRACT

A multilayer film food wrap having outer layers of a polyolefin resin including a cling agent, and a core layer of a resin having a high melting point, resistance to heat, low permeability to oxygen, moisture and odor, and film toughness. Methods of preparing the film and fabricating the film into a bag are also disclosed.

32 Claims, No Drawings

MULTILAYER FOOD WRAP WITH CLING

This application is a continuation of prior U.S. application Ser. No. 552,380, filed Nov. 16, 1983, now abandoned.

FIELD OF THE INVENTION

This invention relates to multilayer food wrap films having good cling properties and high resistance to heat, making them suitable for use in direct food contact cooking. The cling properties of the films enable them to cling to themselves, or to ensure a tight seal when the films are used as a food wrap or a cover for containers.

BACKGROUND OF THE INVENTION

Thermoplastic resin films are popularly used as household wraps and bags to contain food and other items. A necessary characteristic of such wrap films is the ability to "cling", that is, to adhere to itself or to form a tight seal with other surfaces, as when the film is used as a cover for containers. The clingability of the film preserves the freshness and moisture content of wrapped food items and also prevents the migration of food odors.

Thermoplastic resin films do not generally possess inherent cling characteristics sufficient to satisfactorily adhere to themselves and other surfaces. The cling characteristic of thermoplastic films is generally obtained through the use of so-called cling agents. Cling agents are chosen for their ability to produce a surface on a thermoplastic film that can be sealed, opened and resealed, and are selected with due care in consideration of the use of thermoplastic films in food contact applications.

With the increased use of microwave ovens, it has become desirable for food cling wraps to be used in microwave cooking. Currently, commercial food wraps such as Saran Wrap ®, Handi-Wrap ®, and Glad ® Wrap are produced as a single layer film structure that is modified with additives to provide the desired "cling" property. These commercial cling wraps are useful in microwave cooking as a cover for microwave cooking utensils and, as such, are not in contact with the food with which they are to be used. Functionally, it would be desirable to have a food wrap which withstands higher temperatures so that it could be used in direct food contact, and in essence, serve the purpose of a microwave cooking utensil. That is, food would be wrapped in the food wrap, frozen, and when needed the food could be cooked in a microwave oven in the original food wrap.

Commercial food cling wraps may be produced from various polymers such as low density polyethylene, polyvinylidene chloride copolymers, and polyvinyl chloride copolymers. Currently, only polyvinylidene chloride and polyvinyl chloride type food cling wraps are able to withstand somewhat higher microwave oven cooking temperatures, that is, on the order of up to about 335° F. However, at these temperatures, the polyvinylidene chloride and polyvinyl chloride type food wraps have limited use for direct food contact microwave cooking since many fatty foods and foods high in sugar content require higher cooking temperatures than such food wraps can withstand without degradation.

In addition, in the production of plastic films for use as food wraps, a balance must be attained between the film's "cling" and "handleability" characteristics. "Handleability" is the characteristic of the film to resist the tangling that results from the film clinging to itself during use. While cling agents impart good cling properties to the film, it has been found that an increase in the amount of cling agent that is incorporated into the film corresponds to a decrease in the handleability of the film. With increased cling agent, the tendency of the film to adhere to itself and tangle increases.

It is known that handleability is improved through the use of "antiblocking" agents. "Antiblocking" agents prevent thin plastic films from sticking to one another. Antiblocking agents suitable for use in plastic films include, but are not limited to, diatomaceous silica, such as those commercially available under the tradenames "SUPERFLOSS", "SILVERFROST", and "CELITE" which are silica products of the Johns-Manville Company. The concentration of the antiblocking agent incorporated into the film generally ranges from about 100 to about 10,000 parts per million, and usually from about 3,000 to about 7,000 parts per million. As disclosed in U.S. Pat. No. 3,028,355, the diatomaceous silica, referred to as diatomaecous earth in the patent, should generally have an average particle size of between about 2 to about 6 microns. Other antiblocking agents selected by those skilled in the art can also be suitably used.

In addition to having good "cling" and "handleability" characteristics", as well as having a resistance to heat for use in direct food contact microwave cooking, the food wrap should have good barrier properties such as oxygen, moisture, and food odor impermeability. Further, the food wrap should possess a degree of toughness. All of these properties cannot be found in a single layer film food wrap. It is only by providing a multilayer film that all of the aforementioned desirable properties and characteristics may be attained in a food wrap. Multilayer films consist of two or more layers, each imparting specific desired characteristics to the multilayer film.

SUMMARY OF THE INVENTION

The present invention relates to a multilayer film suitable for use in the manufacture of food wraps. In general, the multilayer film of this invention comprises at least outer layers of a polyolefin resin including a cling agent, and a core layer of a thermoplastic resin having a high melting point, resistance to heat for use in direct food contact microwave cooking, low permeability to oxygen, moisture and food odor, and film toughness.

In one embodiment of this invention, the multilayer film comprises a three-layer film having outer layers of a polyolefin resin containing a cling agent and a core layer having the aforedescribed characteristics and properties. In a preferred mode of this embodiment, the multilayer film comprises two outer layers of a polyolefin containing a cling agent and a core layer of a polyamide. The optimum composition of the multilayer film of this embodiment comprises two outer layers of polypropylene containing a cling agent, and a core layer of a polyamide such as Nylon, and preferably Nylon-6.

In another embodiment of this invention, the multilayer film comprises a five-layer film having outer layers of a polyolefin resin containing a cling agent, a core layer of a resin having a high melting point, resistance to heat, low permeability to oxygen, moisture and food odor, and film toughness, and a bonding layer between the core layer and each of the outer layers. In a preferred mode of this embodiment, the multilayer film comprises two outer layers of a polyolefin containing a cling agent, a core layer of a polyamide, and a bonding layer between the core layer and each of the outer layers. The optimum composition of the five-layer film of this embodiment comprises two outer layers of polypropylene containing a cling agent, a core layer of a polyamide such as Nylon-6, and a bonding layer between the core layer and each of the outer layers.

Any suitable thermoplastic resin or copolymer, or mixtures thereof, may be used for the outer layers of the multilayer films of this invention. Typical thermoplastic resins include polyolefins such as low and high density polyethylene, polypropylene, and polybutylene. However, of the polyolefin resins, polypropylene is preferred for the outer film layers because of its higher melting point and better resistance to heat. The outer polyolefin layers, preferably comprising polypropylene, contain a cling agent which makes the film functional as a food wrap. Further, it has been found that not all polypropylene resin types are optimally suitable for the addition of cling agents thereto. More specifically, optimum results are obtained when the outer film layers comprise a polypropylene random copolymer having a melt flow index of between about 2 and about 25 decigrams per minute.

Any suitable cling agent may be present in the outer layers of the multilayer films of this invention. Typical cling agents include glycerol monooleate, sorbitan monooleate, sorbitan trioleate, glycerol dioleate, mono- and diglycerides, vegetable oils, epoxidized soybean oil, fatty esters, polyisobutylene polymers, polybutene polymers, ethoxylated nonylphenols, mineral oil, saturated aliphatic and alicyclic hydrocarbons, polyalkylene ether diols, such as polyepichlorohydrin, trihydric and higher polyhydric alcohols, the liquid esters of the higher molecular weight fatty acids, and polyethers, and surfactants. Preferably, the cling agent present in the outer layers of the multilayer film is glycerol monooleate.

A satisfactory concentration of the cling agent in each of the outer layers of the multilayer film into which it is incorporated is one in the range of from about 0.5 to about 2.0 weight percent, preferably about 0.8 weight percent, based on the weight of each outer film layer. The optimum concentration of cling agent in a thermoplastic resin layer is usually dependent on the particular resin system employed.

Any suitable thermoplastic resin or copolymer, or mixtures thereof, may be employed for the core layer of the multilayer films of this invention. Typical thermoplastic resins having a high melting point, resistance to heat, low permeability to oxygen, moisture and food odor, and film toughness include the polyamides such as Nylon-6, Nylon-6.6, and Nylon-12; polybutylene terephthalate, polyethylene terephthalate, ethylene-vinyl alcohol, and mixtures thereof. However, it is preferred that the core layer comprise a polyamide, and more preferably, that the polyamide comprise Nylon-6, which is commercially available under the tradename Capron-8207 from the Allied Chemical Company.

When the multilayer film of this invention comprises a five-layer film having a bonding layer between the core layer and each of the outer layers, the bonding layer should be sufficient to provide a bonding strength between said core layer and said outer layers of at least about 200 grams/inch of film.

Any suitable bonding material, or mixtures thereof, that exhibit strong adhesion to polar resins may be employed as the bonding layer between the core layer and each of the outer layers in the multilayer film of this invention. Typical bonding materials include adhesive resins such as ionomer copolymers, chemically modified polyolefins, ethylene-vinyl acetate copolymers, ethylene-acrylic acid copolymers, polyolefins grafted with acrylic acid, and other multi-polymer compositions. The chemically modified polyolefin may be obtained from a number of polyolefin resins, such as high, medium and low density polyethylenes, polypropylenes, ethylene vinyl acetate copolymers, and ethylene-acrylic acid copolymers, which are modified by the provision of functional groups to the polymer, which have a strong affinity for the nylon molecule, and which will form strong bonds to nylon under the heat and pressure involved in the coextrusion process. These bonding materials are generally commercially available. For example, ionomer copolymers may be obtained from E. I. DuPont de Nemours and Co. under the tradename Surlyn ® resin. Likewise, the modified polyolefins are available from Chemplex Company of Rolling Meadows, Ill., under the tradename Plexar ® resins, such as Plexar-3, which is a modified ethylene-vinyl acetate copolymer adapted for cast film coextrusion. The preferred bonding materials are selected from modified polyolefins such as Plexar-3, and other multipolymer compositions such as CXA-3101 available from E. I. DuPont de Nemours and Co. The bonding layer between the core layer and each of the outer layers may have a thickness of from about 0.03 mil to about 0.60 mil, preferably from about 0.05 mil to about 0.15 mil. When present, the thickness of the bonding layers may range from about 10 percent to about 20 percent of the total thickness of the multilayer films of this invention.

The total thickness of the multilayer films of this invention may range from about 0.3 mil to about 3 mils, preferably from about 0.5 mil to about 1.0 mil, and more preferably, about 0.75 mil. The thickness of each of the outer layers of the multilayer films of this invention may range from about 0.1 mil to about 1.0 mil, preferably from about 0.2 mil to about 0.4 mil, and more preferably, about 0.32 mil. The thickness of the core layer of the multilayer films of this invention may range from about 0.05 mil to about 1.0 mil, preferably from about 0.08 mil to about 0.5 mil, and more preferably, about 0.11 mil.

The multilayer films of this invention may have an outer layer to core layer to outer layer thickness ratio of from about 1:1:1 to about 4:1:4, but the preferred layer thickness ratio is about 3:1:3. When an adhesive layer is present, the thickness of the adhesive layer is included in the outer layer thickness ratio values.

The multilayer films of this invention may be produced by any of several well-known methods. Preferably, the film may be produced by what is commonly known as the slot cast extrusion method. The film may also be produced by what is commonly known as the air blown film tubular extrusion method, but this latter method is less preferred. The slot cast method produces a film of better clarity than the other methods known to the art. Various cling enhancing agents and/or anti-blocking agents, as the case may be, can be incorporated into the outer layers of the multilayer films of this invention by mixing the agents with the resin, preferably prior to extrusion thereof. For better control, it is preferred to mix the cling agent and/or the antiblocking agent with all of the resin of a particular layer to a final concentration, rather than master batching the additive to the resin, that is, adding a high concentration of the additive to a small amount of the resin and then adding that mixture to the total resin. The multilayer film may be slot cast on conventional extrusion equipment using a conventional slot cast multilayer die or a multilayer adapter for a single layer slot cast die.

The multilayer films of this invention can be slit to a preferred width, for example about 12 inches to about 18 inches, wound on cardboard cores, and packaged in dispensing cartons having the typical metal sawtooth edge cutter bar.

The invention will become more apparent when considered together with the following examples, which are set forth as being merely illustrative of the invention and which are not intended, in any manner, to be limitative thereof. Unless otherwise indicated, all parts and percentages are by weight.

The Cling-to-Glass test used in the examples is designed to measure relative values of cling and employs an Instron® testing instrument, such as an Instron Model TM or its equivalent. The apparatus consists of a glass plate, a clamp which holds one end of a film specimen, about 2.54 cm wide, a string which connects the clamp at one end and a 30 gram weight at the other, a metal or glass rod over which the string slides, a ringstand to hold the rod parallel to the Instron crosshead, and a metal plate which allows the glass plate to be attached to the Instron crosshead.

The sample, about 22.86 cm long by about 2.54 cm wide, is prepared by placing the film wrap between two pieces of paper and cutting on a paper cutter.

About 20.32 cm of the 22.86 cm sample is placed on the glass plate. The film is firmly folded flat onto the plate with a rubber roller. The additional 2.54 cm of the sample is clamped in the small steel clamp. The glass plate is mounted horizontally on the Instron crosshead. A glass or metal rod is held parallel to the plate edge and to the crosshead, about 12.7 cm from the edge of the plate. The string attached to the clamp holding the sample is hung over the rod. A 30 gram mass is attached to the end of the string. In this position the mass is exerting a force which tries to slide the film specimen over the glass plate. Generally, the coefficient of friction is so great that the film will not slide. Initially, the plate and crosshead are 6.35 cm above the rod. The crosshead is lowered at a rate of 50.8 cm per minute and as the plate drops below the level of the rod, the film begins to peel from the plate. When the film releases completely from the plate, the crosshead is stopped. The distance the plate has dropped below the rod is related to the magnitude of adhesive force or cling between the film and the plate. Cling-to-Glass is reported as centimeters of plate travel for the film sample.

EXAMPLE I

A three-layer film was manufactured using the slot cast extrusion method. Polypropylene having a melt flow index of about 6 decigrams per minute, and a cling agent comprising glycerol monooleate, were mixed in a Banbury mixer. The cling agent was present at a concentration of about 0.8% by weight of the mixture. The resulting mixture was fed to an extruder connected to a multiple orifice slot cast extrusion die and the molten mixture was extruded through the two outer orifices of the die forming the outer layers of the three-layer film. Nylon-6 having an approximate melting point of 425° F. and a density of 1.13 g./cc was extruded through the center orifice of the die forming the core layer. The multilayer film had a total thickness of about 0.75 mil, and a layer to layer to layer thickness ratio of about 3:1:3.

EXAMPLE II

A three-layer film was prepared as in Example I except that the multilayer film had a total thickness of about 0.75 mil and a layer to layer to layer thickness ratio of about 2:1:2.

EXAMPLE III

A three-layer film was prepared as in Example I except that the multilayer film had a total thickness of about 0.50 mil and a layer to layer to layer thickness ratio of about 3:1:3.

EXAMPLE IV

A three-layer film was prepared as in Example I except that the multilayer film had a total thickness of about 0.50 mil and a layer to layer to layer thickness ratio of about 2:1:2.

In Table 1, the effectiveness of the multilayer films of Examples I through IV was compared with a commercial single layer polyvinylidene chloride food wrap, and also with a commercial single layer polyethylene food wrap in a microwave oven cooking test. The microwave oven was a commercial Amana® range set on high for a cooking time of about 6 minutes. The food samples comprised (A) about 200 grams of beef patty consisting of about 70% lean ground beef, and (B) about 150 grams of pork sausage made into a patty. During the microwave cooking test, one each of the food samples was individually wrapped with the multilayer film food wraps of Examples I through IV, the commercial polyvinylidene chloride food wrap, and the commercial polyethylene food wrap, and the twelve wrapped food samples were placed in the oven, three samples at one time. Failure of the food wrap was defined as any rupture of the film to permit leakage of grease or juices accumulated from the food samples. Table 1 summarizes these test results.

TABLE 1

| Microwave Oven Test Performance | | |
|---|---|---|
| Food Wrap Film | Beef Patty | Pork Patty |
| Example I | no failure | no failure |
| Example II | no failure | no failure |
| Example III | failed | failed |
| Example IV | failed | failed |
| Polyvinylidene chloride | failed | failed |
| Polyethylene | failed | failed |

From the above results, it was determined that the high melting point Nylon-6 in the core layer of Examples I and II serves as a high temperature supporting layer in the multilayer film structure. It was also found that total film thickness and layer ratios are important factors since the multilayer films of Examples III and IV permitted some leakage of food juices.

EXAMPLES V–VIII

Example V through Example VIII demonstrate that not all polypropylenes in combination with nylon are suitable for food wraps containing a cling agent. It was found that when employing a high melt flow polypropylene and some low melt flow polyallomers, a loss of cling properties was experienced after extrusion. Polyallomers are crystalline polyolefins made from two or more polymers such as ethylene-propylene block copolymers. Example V comprised a slot cast extruded three-layer film consisting of outer layers of a polypropylene copolymer having a melt flow index of about 7 decigrams per minute. Example VI was a slot cast extruded three-layer film comprising outer layers of a polypropylene homopolymer having a melt flow index of about 12 decigrams per minute. Example VII and Example VIII were slot cast extruded three-layer films having outer layers of a polyallomer having a melt flow index of about 2 decigrams per minute, and about 6 decigrams per minute, respectively. The three-layer films of Examples V through VIII each had a core layer of Nylon-6, and each of the film compositions contained about one percent by weight of glycerol monooleate as the cling agent in each of the outer layers. The multilayer films of Examples V through VIII had a total film thickness of about 0.75 mil, and a layer to layer to layer thickness ratio of about 3:1:3. Table 2 summarizes the results of cling tests performed on these film compositions.

TABLE 2

| Cling Properties Of Various Polypropylene Types | | | |
|---|---|---|---|
| | Cling (inches) | | Blocking |
| Example | Glass | Self | Cling (grams) |
| V | 8.6 | 9.7 | 40 |
| VI | 5.2 | 4.9 | 10 |
| VII | 5.5 | 4.3 | 9 |
| VIII | 6.0 | 1.0 | 9 |

In Table 2, it should be noted that the higher the cling value, the better is the clinging property of the film composition. It can be seen from the results that a multilayer film containing the polypropylene copolymer of Example V provides the most desirable cling properties.

EXAMPLES IX-XIV

Example IX through Example XIV illustrate the barrier properties of various food wrap compositions with respect to moisture vapor transmission, oxygen permeability, and onion odor permeability. Example IX through Example XII comprised three-layer films manufactured by slot cast extrusion wherein the outer layers were made from polypropylene having a melt flow index of about 7 decigrams per minute and a density of about 0.897 g/ml., and each outer layer contained about 0.8 percent by weight of glycerol monooleate. The core layer comprised Nylon-6. The film wrap of Example IX had a total film thickness of about 0.43 mil, and a layer to layer to layer thickness ratio of about 2:1:2. The film wrap of Example X had a total film thickness of about 0.71 mil, and a layer to layer to layer thickness ratio of about 2:1:2. The film wrap of Example XI had a total film thickness of about 0.42 mil, and a layer to layer to layer thickness ratio of about 3:1:3. The film wrap of Example XII had a total film thickness of about 0.64 mil, and a layer to layer to layer thickness ratio of about 3:1:3. The film wrap of Example XIII was a single layer commercial polyethylene product having a film thickness of about 0.45 mil. The film wrap of Example XIV was a single layer commercial polyvinylidene chloride produce having a film thickness of about 0.46 mil.

The barrier properties of the film wrap compositions of Examples IX through XIV are summarized in Table 3. In Table 3, the values shown for the moisture vapor transmission are reported as grams per 100 square inches of film wrap per 24 hours. The oxygen permeability values are reported as cubic centimeters per 100 square inches of film wrap per 24 hours. For the onion odor permeability results reported, sliced raw onions were placed in separated beakers which were covered with the film wrap of Examples IX through XIV, respectively. A panel of five persons rated the sample beakers for odor detection. The panel was in 100% agreement for the odor detection evaluation.

TABLE 3

| | Barrier Properties | | |
|---|---|---|---|
| Example | Moisture Vapor Transmission | Oxygen Permeability | Onion Odor Permeability |
| IX | 2.5 | 21.6 | yes |
| X | 2.3 | 9.8 | no |
| XI | 2.9 | 31.1 | yes |
| XII | 2.1 | 17.0 | no |
| XIII | 1.8 | 960 | yes |
| XIV | 0.5 | 1.8 | no |

From the above results, it can be seen that polyvinylidene chloride film wrap has excellent barrier properties, whereas polyethylene has very poor oxygen barrier properties. It can also be seen that of the three-layer film wraps, the compositions of Example X and Example XII provide the most satisfactory barrier properties.

The film wrap compositions of Example IX through Example XIV were also evaluated for strength and toughness properties. Table 4 summarizes the various physical properties evaluated on these film wrap compositions.

The values for the physical properties reported in Table 4 were obtained pursuant to the ASTM test methods indicated in Table 4 with the exception of the melting point values and the puncture toughness values. The melting point values given in Table 4 were obtained with a differential scanning calorimeter. The composition of polymer blends wherein the parent polymers have sufficiently different polymer crystallinity melt temperatures can be determined using differential scanning calorimetry. The method is based on the measurements of the heat of fusion for the respective parent polymers. The amount of polymer crystallinity, upon which this heat of fusion is based, is sensitive to thermal history. Known standards upon which a calibration curve is based, and samples, are pretreated in the same manner to obtain valid correlations.

The puncture toughness values were obtained using an Instron Tensile-Compression Tester. The tensile tester used was Instron Model TM, and the compression tester was Model G-03-2 having a full scale range of 0-1 to 0-50 pounds employed with compression cell CC. The test is similar to ASTM method D-1709 which employs free falling darts and E-154 which employs a slowly moving plunger to measure the puncture resistance of films used as vapor barriers. The puncture resistance is a measure of the force required to rupture a test specimen, and the energy absorbed by the film during rupture.

TABLE 4

| Physical Property | ASTM METHOD | Example IX | X | XI | XII | XIII | XIV |
|---|---|---|---|---|---|---|---|
| Puncture toughness | | | | | | | |
| load (lbs) | | 7.9 | 10.1 | 6.0 | 9.4 | 3.3 | 15.8 |
| energy (in. - lbs) | | 14.2 | 18.0 | 10.6 | 17.9 | 4.1 | 8.0 |
| Tensile Strength, load | D-882 | | | | | | |
| machine direction (lbs/in.$^2$) | | 4.5 | 4.7 | 3.6 | 4.2 | 2.1 | 5.0 |
| transverse direction (lbs/in.$^2$) | | 2.6 | 3.1 | 1.9 | 2.9 | 0.6 | 5.7 |
| Elongation, % | D-882 | | | | | | |
| machine direction | | 339 | 335 | 305 | 359 | 157 | 21 |
| transverse direction | | 351 | 349 | 356 | 368 | 126 | 26 |
| Secant modulus (psi × 10$^3$) | D-882 | | | | | | |
| machine direction | | 87 | 68 | 86 | 72 | 24 | 112 |
| transverse direction | | 89 | 81 | 89 | 83 | 26 | 106 |
| Elmendorf tear (grams/mil) | D-1922 | | | | | | |
| machine direction | | 23 | 72 | 30 | 66 | 248 | 9 |
| transverse direction | | 307 | 99 | 675 | 175 | 366 | 4 |
| Dart drop total grams | D-1709 | 80 | 150 | 90 | 100 | 25 | 150 |
| Melting point, °F. | | 307/426 | 307/426 | 307/426 | 307/426 | 235 | 334 |

From the values obtained for the film compositions of Examples IX, X, XI and XII, it can be seen that these compositions possess puncture toughness and tensile strength load properties which are superior to those of the single layer commercial polyethylene product of Example XIII. Further, the film compositions of Examples IX, X, XI and XII possess puncture toughness energy properties which are superior to those of both the single layer commercial polyethylene product of Example XIII and the single layer commercial polyvinylidene chloride product of Example XIV. In addition, the tear strength properties of the film compositions of Examples IX, X, XI and XII are substantially greater than those of the polyvinylidene chloride product of Example XIV. It can also be seen that the film compositions of Examples IX, X, XI and XII have a high melting point, i.e., substantially higher than the single layer polyethylene film of Example XIII, thus enabling their use in micro-wave cooking applications.

The multilayer film wrap compositions of this invention also possess clinging properties enabling the film wrap to seal to itself when used for wrapping foods, storing the wrapped food in a freezer, and cooking the food in the film wrap such as in a microwave oven. The multilayer film wraps are also well-suited for use as a cover for containers, and can also be used to protect sandwiches and other foods.

Although the present invention has been described and set forth in some detail, it should be further understood that the same is susceptible to changes, modifications and variations without departing from the scope and spirit of the invention as set forth in the appended claims. Such changes, modifications and variations are within the scope of this invention.

We claim:

1. A multilayer film suitable for use in microwave oven cooking consisting essentially of outer layers of a polyolefin resin including a cling agent, each of said outer layers having a thickness of from about 0.1 mil to about 1.0 mil, said polyolefin resin being selected from the group consisting of polyethylene, polypropylene, and polybutylene, and a core layer of a thermoplastic resin having a melting point of at least about 335° F., resistance to heat, low permeability to oxygen, moisture and odor, and film toughness, said thermoplastic resin being selected from the group consisting of polyamides, polybutylene terephthalate, polyethylene terephthalate, ethylene-vinyl alcohol, and mixtures thereof.

2. A multilayer film in accordance with claim 1 wherein said cling agent is selected from the group consisting of glycerol monooleate, sorbitan monooleate, sorbitan trioleate, glycerol dioleate, mono- and diglycerides, vegetable oils, fatty esters, polybutene polymers, polyisobutylene polymers, ethoxylated nonylphenols, mineral oil, saturated aliphatic and alicyclic hydrocarbons, and surfactants.

3. A multilayer film in accordance with claim 1 wherein said cling agent is present in each of said outer layers at a concentration of from about 0.5 to about 2.0 percent by weight, based on the weight of said outer layers.

4. A multilayer film in accordance with claim 1 wherein said polyamides include Nylon, Nylon-6, Nylon-6,6, and Nylon-12.

5. A multilayer film in accordance with claim 1 wherein said outer layers of polyolefin resin comprise polypropylene and said core layer comprises a polyamide.

6. A multilayer film in accordance with claim 1 including a bonding layer between said core layer and said outer layers.

7. A multilayer film in accordance with claim 6 wherein said bonding layer provides a bonding strength between said core layer and said outer layers of at least about 200 grams/inch of said film.

8. A multilayer film in accordance with claim 6 wherein said bonding layer comprises an adhesive resin selected from the group consisting of ionomer copolymers, modified polyolefins, ethylene-vinyl acetate copolymers, ethylene-acrylic acid copolymers, polyolefins grafted with acrylic acid, and mixtures thereof.

9. A multilayer film in accordance with claim 1 wherein said outer layers of polyolefin resin comprise a polypropylene random copolymer having a melt flow index of between about 2 and about 25 decigrams per minute.

10. A multilayer film in accordance with claim 1 wherein the total thickness of said film is from about 0.3 mil to about 3 mils.

11. A multilayer film in accordance with claim 1 wherein the thickness of said core layer is from about 0.05 mil to about 1.0 mil.

12. A multilayer film in accordance with claim 6 wherein the thickness of said bonding layer is from about 0.03 mil to about 0.60 mil.

13. A multilayer film in accordance with claim 1 wherein said film has an outer layer to core layer to outer layer thickness ratio of from 1:1:1 to about 4:1:4.

14. A bag fabricated from the multilayer film of claim 1.

15. A method of preparing a multilayer film suitable for use in microwave oven cooking comprising slot cast extruding outer layers of a polyolefin resin including a cling agent, each of said outer layers having a thickness of from about 0.1 mil to about 1.0 mil, said polyolefin resin being selected from the group consisting of polyethylene, polypropylene, and polybutylene, and a core layer of a thermoplastic resin having a melting point of at least about 335° F., resistance to heat, low permeability to oxygen, moisture and odor, and film toughness, said thermoplastic resin being selected from the group consisting of polyamides, polybutylene terephthalate, polyethylene terephthalate, ethylene-vinyl alcohol, and mixtures thereof.

16. A method in accordance with claim 15 wherein said cling agent is selected from the group consisting of glycerol monooleate, sorbitan monooleate, sorbitan trioleate, glycerol dioleate, mono- and diglycerides, vegetable oils, fatty esters, polybutene polymers, polyisobulytene polymers, ethoxylated nonylphenols, mineral oil, saturated aliphatic and alicyclic hydrocarbons, and surfactants.

17. A method in accordance with claim 15 wherein said cling agent is present in each of said outer layers at a concentration of from about 0.5 to about 2.0 percent by weight, based on the weight of said outer layers.

18. A method in accordance with claim 15 wherein said polyamides include Nylon, Nylon-6, Nylon-6,6, and Nylon-12.

19. A method in accordance with claim 15 wherein said outer layers of polyolefin resin comprise polypropylene and said core layer comprises a polyamide.

20. A method in accordance with claim 15 including applying a bonding layer between said core layer and said outer layers.

21. A method in accordance with claim 20 wherein said bonding layer provides a bonding strength between said core layer and said outer layers of at least about 200 grams/inch of said film.

22. A method in accordance with claim 20 wherein said bonding layer comprises an adhesive resin selected from the group consisting of ionomer copolymers, modified polyolefins, ethylene-vinyl acetate copolymers, ethylene-acrylic acid copolymers, polyolefins grafted with acrylic acid, and mixtures thereof.

23. A method in accordance with claim 15 wherein said outer layers of polyolefin resin comprise a polypropylene random copolymer having a melt flow index of between about 2 and about 25 decigrams per minute.

24. A method in accordance with claim 15 wherein the total thickness of said film is from about 0.3 mil to about 3 mils.

25. A method in accordance with claim 15 wherein the thickness of said core layer is from about 0.05 mil to about 1.0 mil.

26. A method in accordance with claim 20 wherein the thickness of said bonding layer is from about 0.03 mil to about 0.60 mil.

27. A method in accordance with claim 15 wherein said film has an outer layer to core layer to outer layer thickness ratio of from about 1:1:1 to about 4:1:4.

28. A method in accordance with claim 15 including fabricating a bag from said multilayer film.

29. A multilayer film suitable for use in microwave oven cooking comprising two outer layers of polypropylene containing a cling agent, and a core layer of a thermoplastic resin having a melting point of at least about 335° F., resistance to heat, low permeability to oxygen, moisture and odor, and film toughness, said thermoplastic resin being selected from the group consisting of polyamides, polybutylene terephthalate, polyethylene terephthalate, ethylene-vinyl alcohol, and mixtures thereof.

30. A multilayer film in accordance with claim 29 wherein said polypropylene comprises a polypropylene random copolymer having a melt flow index of between about 2 and about 25 decigrams per minute.

31. A method of preparing a multilayer film suitable for use in microwave oven cooking comprising slot cast extruding two outer layers of polypropylene containing a cling agent, and a core layer of a thermoplastic resin having a melting point of at least about 335° F., resistance to heat, low permeability to oxygen, moisture and odor, and film toughness, said thermoplastic resin being selected from the group consisting of polyamides, polybutylene terephthalate, polyethylene terephthalate, ethylene-vinyl alcohol, and mixtures thereof.

32. A method of preparing a multilayer film in accordance with claim 31 wherein said polypropylene comprises a polypropylene random copolymer having a melt flow index of between about 2 and about 25 decigrams per minute.

* * * * *